INVENTORS
Georges Cerles
Pierre Audemar

United States Patent Office 3,286,465
Patented Nov. 22, 1966

3,286,465
DRIVE REGULATING MECHANISMS
Georges Cerles, Gardanne, and Pierre Audemar, Paris, France, assignors to Pechiney, Compagnie de Produits Chimiques et Electrometallurgiques, Paris, France, and Societe Alsacienne de Constructions Mecaniques, Paris, France
Filed Dec. 3, 1963, Ser. No. 327,847
10 Claims. (Cl. 60—54.5)

The present invention concerns means for regulating the length of the reciprocating stroke of a driven member, this member being acted on by a driving member which itself executes a reciprocating movement of constant length. The invention is particularly concerned with the regulation of the stroke of members in linear reciprocating movement and especially with the regulation of the piston stroke of a pump.

In a pump wherein the piston is set in motion from a motive source rotating at constant speed by means of a rod and crank system, means according to the invention can be interposed between the crosshead attached to the bottom of the rod and the piston rod of the pump. As will appear, the amount discharged by the pump may then, if desired, be varied from maximum discharge to zero while the pump is operating.

The invention comprises interpolating between the drive member and the driven member a hydraulic coupling system enabling these two members to be cyclically connected or enabling them to be uncoupled at chosen points in each of the forward and backward strokes. This has the result that the driven member can perform only a chosen fraction of its stroke.

According to one feature of the invention, the hydraulic connecting system interposed between the drive member and the driven member comprises a combination of a double-acting piston pump and a double-acting jack. These two appliances are associated at least by a hydraulic circuit disposed so that in one circuit arrangement the pump discharges into the jack, and in another arrangement, the jack is isolated from the pump. One or other of these hydraulic circuit arrangements are established selectively in the course of each forward stroke and each backward stroke of the drive member, depending on the position of the driven member (which is connected to the active element of the jack) and depending on the position and/or the direction of displacement of the drive member (which is connected to the piston of the pump).

In the case of the means being applied to varying the piston stroke of a pump, it is advantageous to make the hydraulic circuit pass automatically from the arrangement where the jack is isolated to that where the driving and driven members are connected. This is preferably accomplished at the moment when the drive member is at one of the ends of its stroke (for example at the upper or lower dead center point of the rod-and-crank driving system), so that the driven member (piston of the pump) can be re-started without impact, thus preventing slapping and wear on the intake and delivery valves.

As the hydraulic connecting system is preferably an oil circuit, the above mentioned pump will hereinafter be referred to as the "oil pump" in order to distinguish it from the driven member of variable stroke, which may also be a pump. However, it should be understood that this term implies no restrictions, since any other liquid could be used to establish the hydraulic connection.

In a means for varying the stroke in accordance with the invention, the members such as gate valves, clack valves or the like controlling the formation of the various hydraulic circuit arrangements are disposed so that, in the circuit arrangement or arrangements in which the jack is isolated, the liquid discharged by the oil pump during the corresponding part of its stroke is evacuated towards a tank or is forced back in a closed circuit onto the other face of the piston of the oil pump. One or other of these means for isolating the jack relatively to the oil pump may be used separately or in combination.

In a simple embodiment of the invention, the coupling between the double acting oil pump and the double acting jack may simply comprise two pipes respectively linking each of the chambers of the pump to each of the chambers of the jack. The circuit also comprises a controlled drainage and oil suction pipe for each of the chambers of the pump. In this arrangement the oil pump and the jack may be mechanically independent of and even remote from one another.

It is advantageous for the oil pumps and the jack to be combined not merely hydraulically but also mechanically. In another embodiment, the piston of the pump and the piston of the jack are housed in a single cylinder in which they define three compartments of variable volume, the end compartments communicating with one another by means of a pipe. Appropriate gate valves mounted on the intermediate compartment and on the end compartment towards the pump permit controlled drainage of the oil or permit the oil to be sucked out of a tank into these compartments. When the gate valves are closed, the two pistons are hydraulically connected and the driving and driven members are displaced synchronously along identical strokes. On the other hand, if one compartment of the pump is drained at a given point in each of the forward or backward strokes, the piston of the jack portion will cease to be driven along the remaining part of the piston stroke of the oil pump and will be immobilized by the actuation of the control means.

Controlled operation of the drainage valves takes place automatically at each forward or backward stroke, through a member connected to the rod of the jack impinging on an adjustable stop. The valves may either be actuated directly or, in the usual manner, by means of hydraulic relays.

The system for varying the stroke according to the invention may be formed with other combinations of an oil pump and a jack.

Thus, the drive member may be attached to a piston sliding in a movable cylinder which is filled with oil and is itself attached to the driven member. In this arrangement, the piston divides the cylinder into two compartments which may be selectively isolated from one another or put into communication (with one another or with a tank) by an appropriate set of valves.

In yet another embodiment, either the driving or the driven member may be connected to two concentric pistons linked by a rod, the first piston sliding in a fixed cylinder and the second piston in a movable cylinder. The movable cylinder slides in the fixed cylinder (within which it acts as a piston) and is connected to the other (driving or driven) member. The means thus comprise two main oil chambers inversely variable in volume. When their volume cannot be varied, these connect the driving and driven members, and the members are uncoupled by putting the two chambers into communication, either with one another or with a low pressure oil reservoir into which they can be drained or out of which they can suck oil.

Whatever oil pump-jack combination is chosen, one or other hydraulic circuit arrangement for coupling or uncoupling the driving and driven members is formed cyclically by the opening or closing of conventional valves. Some of these are sensitive to differential pressures (non-return valves) so as to recouple the members automatically at the beginning of the forward and backward strokes of the drive member. Others are controlled by the position of the driven member, through an ordinary mechanically, hydraulically or electrically operated end of stroke stop system, so as to uncouple the members by draining the pump portion.

It is a general object of this invention to provide an improved coupling mechanism which comprises an extremely efficient means for regulating and varying a movement of a reciprocating driven member wherein the driving member is set for movement in a regular fashion.

It is an additional object of this invention to provide a hydraulic coupling member of the type described which is particularly suitable for the regulation of the stroke of driven members wherein these members are designed for linear reciprocating movement as in the case of the piston stroke of a pump.

These and other objects of this invention will appear hereinafter and for purposes of illustration but not of limitation, specific embodiments of this invention are shown in the accompanying drawings in which.

Figure 1:
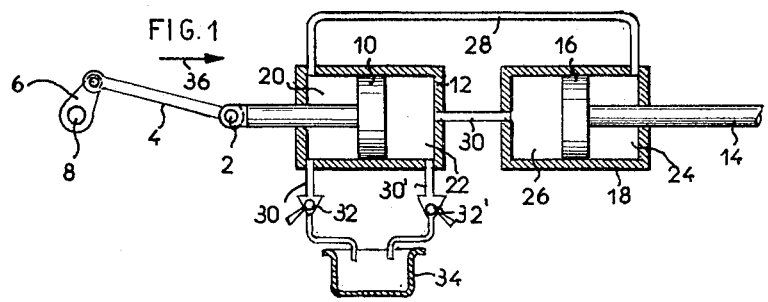
FIGURE 1 is a diagrammatic sectional view of a coupling device with means for regulating the stroke in accordance with the invention.

In the embodiment shown diagrammatically in FIGURE 1, the drive member comprises a crosshead 2 which is made to execute a linear reciprocating movement of constant length by a rod system 4, of which the crank 6 is fixed to a drive shaft 8. The crosshead 2 is coupled to the rod of a piston 10 which slides in an oil-filled cylinder 12, this unit constituting the oil pump portion of the hydraulic coupling. The rod 14 of the piston 16 of a double-acting oil jack 18 is linked to the driven member of variable stroke, for example the piston of a pump with variable discharge. The chambers 20, 22 of the pump and 24, 26 of the jack are respectively joined by pipes 28, 30.

When the pump-jack unit is filled with oil, the pistons 10 and 16 are hydraulically connected and the driven member moves along the whole of its stroke synchronously with the driving member.

Associated with each of the chambers 20, 22 of the pump are identical drainage and suction pipe 30, 30' provided with a non-return valves and a stop valve with controlled opening means. The non-return valve and stop valve may advantageously be combined into a single apparatus 32, 32' (as shown diagrammatically in FIGURE 1), in which an operating rod causes the operating clack valve to be raised so as to drain the oil. The ends of the two pipes discharge into an oil tank 34.

The operation of the hydraulic coupling according to the invention can be seen clearly from the figure. During the first part of the forward stroke of the piston 10 (in the direction of the arrow 36), the valves 32, 32' are closed and the oil pump forces the oil back into the jack through the pipe 30, the oil returning through the pipe 28. When the driven member has reached that point in its stroke where it is desired to terminate the drive, the valve 32' is opened, so that during the remainder of the forward stroke of the piston 10 the oil forced back from the chamber 22 is evacuated into the tank 34 through the pipe 30', and the chamber 20 increases in volume and sucks oil out of the tank, this suction causing the non-return valve 32 to be raised. The driven member is therefore not driven for the whole of this part of the forward stroke.

As soon as the piston 10 has reached the end of its forward stroke and started its backward stroke, the volume of the chamber 20 of the pump starts to diminish, so that the non-return valve 32 is re-closed and the oil can be forced back from the chamber 20 of the pump towards the chamber 24 of the jack through the pipe 28. The piston 16 and consequently the driven member thus start their return stroke at the same time as the piston 10, that is to say, the coupling is made without impact at the moment when the piston 10 stops to reverse its direction. The two pistons are thus reconnected and the valve 32', which was previously open, can be re-closed at any point in this part of the return stroke.

When the driven member reaches that point in its return stroke where it is desired to terminate the drive (preferably the end of its return stroke), the valve 32 is opened, so that the oil in the chamber 20 of the pump, instead of continuing to be forced back through the pipe 28 toward the chamber 24 of the jack, is evacuated into the tank 34. The chamber 22 simultaneously sucks the oil out of the tank through the open non-return valve 32'. The hydraulic coupling between the pistons 10 and 16 is thus interrupted until the piston 10 has reached the end of its return stroke and started its forward stroke, with the result that the non-return valve 32' is closed and the driving and driven members are connected again as at the beginning of the cycle. Here again it will be seen that the piston 16 is re-started without impact when the piston 10 reverses its direction, and that the valve 32 may be closed at any time during the forward stroke of the piston 16. The cyclic opening and closing of the valves 32 and 32' forms the hydraulic circuit arrangements corresponding to the coupling or uncoupling of the driving and driven members at a given point which may be variable for each forward or return stroke.

Cyclic operation of the valves is of course controlled automatically by ordinary systems, some of which will be described in greater detail with reference to other embodiments. This operation depends on the position of the driven member or of an element of the apparatus connected thereto, for example the rod of the piston 14.

It is advisable for the lengths of stroke of the driven member to be varied by eliminating part of its stroke either at the beginning or at the end, so that one of the two valve operations causing the pistons to be uncoupled in the course of a complete cycle may take place at an invariable point in the stroke of the driven member. The stroke of the driven member is regulated merely by choosing the moment at which only one of the valves is opened.

Figure 2:
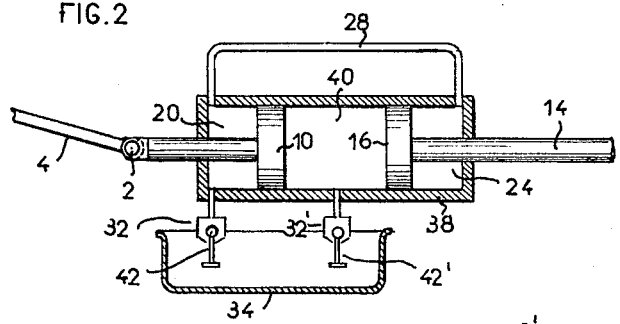
FIGURE 2 is a diagram representing another embodiment of the double acting pump-jack combination used in a coupling according to the invention.

In the embodiment shown diagrammatically in FIGURE 2, the pump and the jack of the coupling are hydraulically and mechanically combined, that is to say, the pistons 10 and 16, instead of moving in independent cylinders 12 and 18 as in the preceding case, are mounted in a single cylinder within which they define three chambers 20, 24, 40 of variable volume. The operation of the coupling is identical, since the intermediate chamber 40 replaces the unit previously formed by the chamber 22 of the pump and the chamber 26 of the jack, which were kept permanently in communication by the pipe 30. Non-return valves 32, 32', of which the clack valves may be raised subject to the control of operating needles 42, 42', enable the chambers 20 and 40 to be put into communication with an oil tank 34 at desired points in the stroke. The non-return valves may of course be located at any point in the pressure circuit of the chambers 20 and 40 and, in particular, the valve 32 may be connected to the pipe 28.

The FIGURE 2 embodiment provides a compact, economic construction for the hydraulic coupling, in which the driving and driven members are aligned. In the example shown in FIGURE 1 the pump and jack portions of the coupling may, on the other hand, be separated or spaced apart. In both cases it is possible for the pistons 10 and 16 to be of different diameters, if the hydraulic coupling is required to transmit movements with a given conversion ratio.

Figure 3:
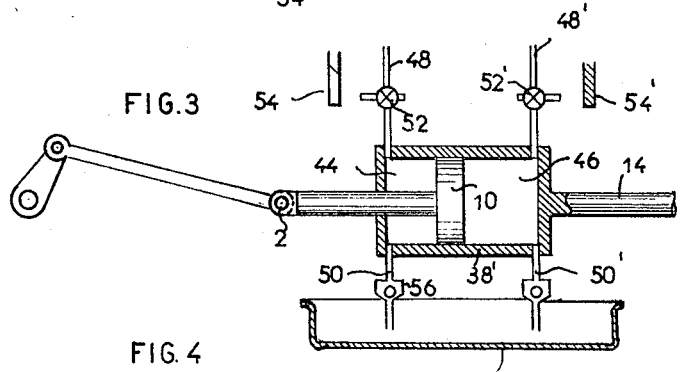
FIGURE 3 is a diagrammatic view of another embodiment, in which the forementioned combination comprises only one piston and one cylinder.

FIGURE 3 shows another modification of an oil pump-jack combination enabling the end of the stroke to be hydraulically regulated in accordance with the invention. Starting from the example in FIGURE 2, the piston 16 and cylinder 38 may be made integral without in any way altering the operation of the device, provided that the cylinder is free to move in translation parallel to its axis. This arrangement is the one shown in FIGURE 3, in which the driven member 14 is rigidly connected to the cylinder 38', which is movable in translation, the part of the piston 16 being played by the bottom of the cylinder 38'. In this new pump-jack combination, the piston 10 divides two compartments 44 and 46 of variable volume, having the same functions as the compartments 20 and 40 of FIGURE 2.

These two compartments are provided with drainage pipes 48, 48' having controlled valves and with suction pipes 50, 50' having non-return valves (the drainage and suction circuits have been shown separately, but they could of course be combined like the circuits 30, 32 in the preceding embodiments).

The drainage valves 52 and 52', which are mounted on the cylinder 38' and thus integral in translation with the driven member 14, may be resiliently returned to the closed positions and, conversely, may be opened when their operating lever impinges respectively on a fixed abutment 54 and an abutment 54' of variable position.

In the position shown in FIGURE 3, the crosshead is hydraulically connected to the driven member 14 when the two chambers 44 and 46 are closed. When the operating lever for the valve 52' strikes the abutment 54' in the course of its advance in the direction of the arrow 36, the valve opens and the chamber 46 is drained. The cylinder 38' is then no longer driven to the end of the stroke of the piston 10, and the oil in the tank 34 is sucked through the pipe 50 into the chamber 44.

As soon as the piston 10 starts its return stroke, the coupling is formed by the automatic closing of the non-return valve 56, in spite of the fact that the valve 52' opens. As soon as the cylinder is driven backwardly, the valve 52' leaves the abutment 54' and recloses, so that the coupling is re-established until the operating lever of the valve 52 strikes the abutment 54.

It will be seen that the stroke of the driven member 14 may be regulated between its maximum value and a value as low as is desired, simply by displacing the abutment 54'. This makes it possible, for example, to vary at will the amount discharged by a pump of which the piston is coupled to the driven member 14.

Figure 4:
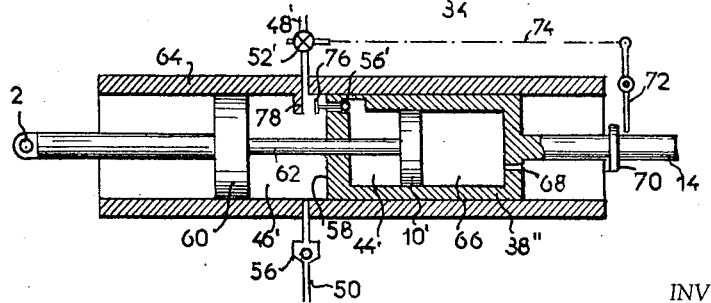
FIGURE 4 is a diagram illustrating another embodiment.
Figure 5:
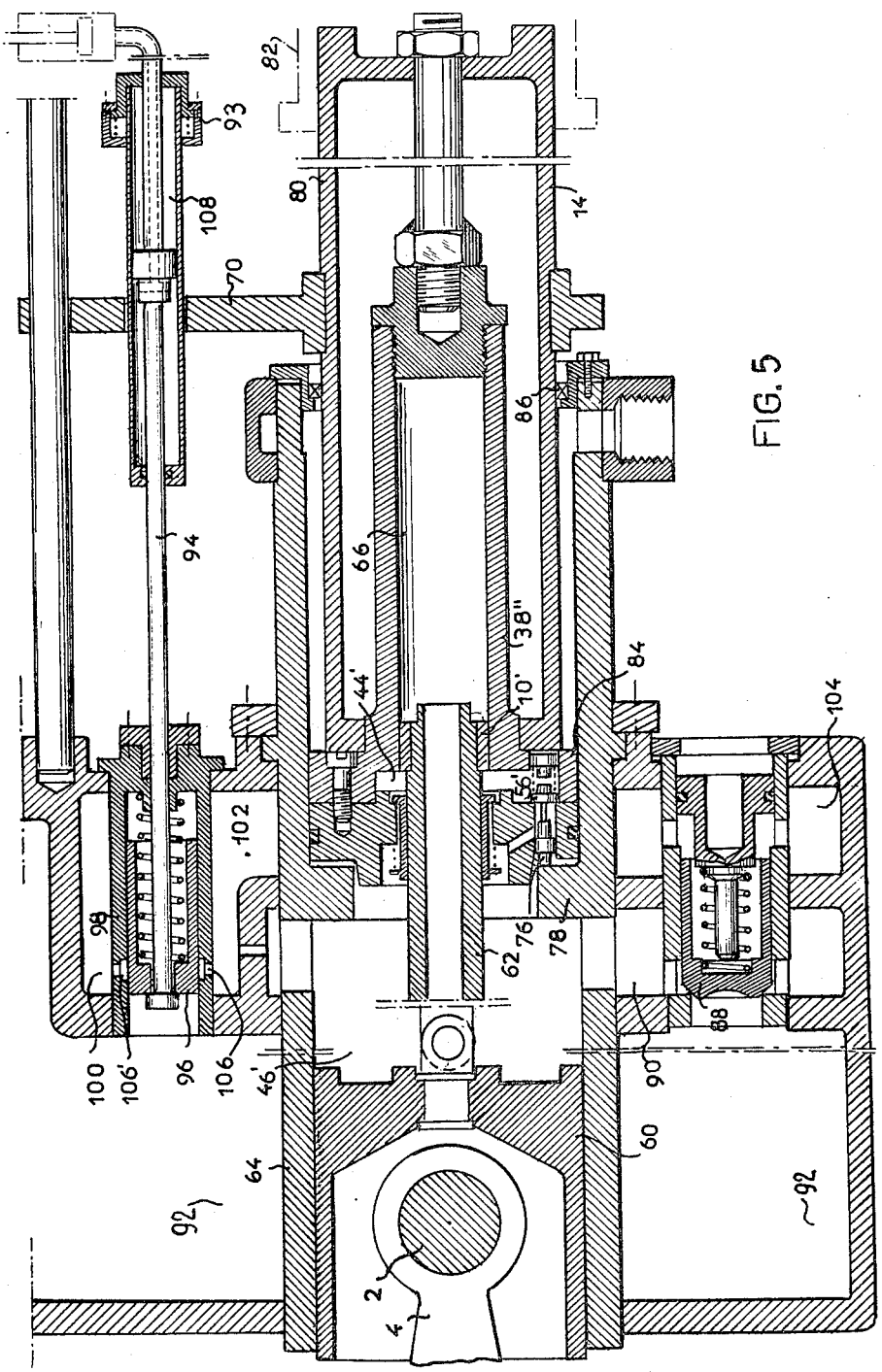
FIGURE 5 is a detailed view of a coupling as in the FIGURE 4 embodiment.

Another advantageous embodiment of the invention is shown diagrammatically in FIGURE 4 and in greater detail in FIGURE 5. It comprises a different combination of a double-acting oil pump and a double-acting jack. It will be noted that in the FIGURE 3 example, the piston 10 operated with both faces and defined two chambers 44 and 46. In the modification shown in FIGURE 4, the piston 10', which slides inside a movable cylinder 38", operates only with one of its faces, thus defining an oil chamber 44', which has the same function as the chamber 44 in the preceding example.

The second oil chamber 46' is bounded by the external face 58 of the bottom of the cylinder 38", by a second piston 60 rigidly connected to the crosshead 2 (and consequently to the piston 10' to which it is connected by a rod 62) and finally by the internal surface of a fixed cylinder 64, within which the piston 60 and cylinder 38" slide. It will thus be appreciated that in this new pump-jack combination the oil chamber 46' fulfills the same function (and undergoes the same variations in volume) as the chamber 46 in the example shown in FIGURE 3.

The chamber 66 plays no active part and may be left in contact with the atmosphere through holes 68, or else may be permanently in contact with the chamber 46', for example if the rod 62 is hollow. Mounted on the chamber 66 is a drainage pipe 48' having a valve 52' with controlled opening means and a suction pipe 50 having a non-return valve.

The control means for the valve 52', is dependent on the position of the rod 14, and has been shown diagrammatically. At the point in the forward stroke chosen for uncoupling, a stop 70 carried by the rod 14 actuates a pivoting lever 72 which is connected by a rod system 74 to the slide or similar member of the valve 52'. When this valve opens, the oil in the chamber 46' is drained off through the pipe 48' towards the tank until the end of the stroke of the pistons 60 and 10'. During this time, the cylinder 38" and thus the driven member are immobile.

As soon as the return movement of the piston 10' starts, the oil in the chamber 44' is compressed, so that the clack valve of the non-return valve 56' is closed, and the cylinder 38" is driven backwardly together with the piston 10' until the operating needle 76 of the non-return valve 56' meets a fixed abutment 78. At this moment the connection is broken, the oil in the chamber 44' is drained into the chamber 46', and the chamber 46' simultaneously sucks oil out of the tank through the pipe 50 and the non-return valve 56.

It will be seen that all that is required to obtain the desired stroke is to adjust the position of the abutment 70 or, if the stroke is to be regulated while the apparatus is operating, it is sufficient to adjust the length of the rod system 74 so that the valve 52' opens at the desired point in the stroke.

In the detailed view shown in FIGURE 5, which corresponds to the diagram in FIGURE 4, the device is interposed between the crosshead 2 of a rod 4 and the piston 80 of a pump with variable discharge. The body 82 of the pump is only partially shown and the pump may be of any type.

The piston 60 and the piston 10' are connected by the rod 62 and coupled to the crosshead 2 in a tandem arrangement. The piston 60 slides in the fixed cylinder 64 and the piston 10' in the movable cylinder 38'. This cylinder carries seal fittings 84 and can slide in a tight manner inside the fixed cylinder 64. A guiding ring 86 holds the external casing 14 of the cylinder 38" relatively to the fixed cylinder 64. In this embodiment the chamber 66, which plays no active part in the operation of the device, is permanently in communication with the oil chamber 46' by means of the rod 62.

The opening of the non-return valve 56' is controlled, at the end of the return stroke, by the lug 76 coming into contact with the abutment 78 integral with the cylinder 64, the valve 56' is identical with that shown in FIGURE 4.

The drainage and suction valves 52' and 56 shown in FIGURE 4 are replaced by one or more non-return valves 88 with controlled opening means, which are operated hydraulically instead of mechanically. The valve 88 is mounted between a chamber 90 communicating with the chamber 46' and a low-pressure oil reservoir or tank 92.

A stop 70 is rigidly connected to the driven member 14 and, at the point in the forward stroke chosen for uncoupling the driven from the driving member, this stop engages an adjustable abutment 93 which controls the withdrawal of a slide 96 by means of a rod system 94.

The slide 96 moves in a body 98 which is disposed in a chamber 100, 102 communicating with the chamber 46' and with a chamber 104 which in turn communicates with the internal face of the clack valve 88. Withdrawal of the slide 96 exposes the drainage orifices 106, 106', which lowers the pressure in the chambers 100, 102, 104 and thus on the internal face of the clack valve 88, so that the latter opens. The chamber 46' may thus be drained through an orifice of wide section.

Starting from the position shown in the figure, (the end of the return stroke of the crosshead 2), the means operate as follows: by means of the oil cushion of the chamber 46', the piston 60 repels the piston 84 which is connected to the cylinder 38", with the result that the driving and driven members are coupled. At the point in the stroke pre-selected for uncoupling, the stop 70 actuates the slide 96 and the oil in the chamber 46' is drained into the tank 92, so that the driven member is no longer driven during this part of the stroke. The piston 10' thus advances into the cylinder 38" and the volume of the chamber 44' increases, thus causing oil to be sucked out of the chamber 46' and towards the chamber 44' to the valve 56', which opens. At this phase of the operation, the piston 38" is prevented from returning by the very dependence of the valve 88 which, if the piston were to return, would automatically reform the coupling and thus return the piston 38" to its end of forward stroke position. As soon as the piston 60 has returned after the end of the forward stroke, the coupling is re-established without initial impact, by means of the oil cushion which is unable to escape from the chamber 44'. At the end of the return stroke of the piston 84 in the cylinder 64, the coupling is broken again by the impingement of the lug 76 of the nonreturn valve 56' on the stationary abutment 78.

Positioning of the abutment 93 on the rod system 94 during operation or in the state of rest determines the length of the stroke. The positioning may be effected by hydraulic control means of normal adjustable length including a jack 108.

Particularly in cases where the moving members have relatively high speeds, it may be advantageous to prevent a movable abutment (member 70) from coming into contact with a stationary abutment (member 93) with impact at each cycle, thus causing the closing slide 96 to be opened abruptly. The FIGURE 6 modification shows a control system for a slide 96' (fulfilling the same function as the slide 96 in FIGURE 5), wherein the slide has a linear reciprocating movement of constant length but of variable origin.

One of the ends 110 of a flexible link 112 (chain or cable) is fastened to a bracket 70' connected to the variable-stroke piston 80 of the pump 82. The flexible link passes over a pulley 114, having a shaft rigidly connected to the slide 96'. The other end of the link is wound about a drum 116, the angular position of which may be adjusted by means of an operating hand wheel 118. A spring 120 keeps the transmission permanently taut.

With this type of reversing means, the slide 96' is displaced synchronously with the piston 80 of the pump, but its stroke is one-half that of the piston. During each cycle, the retracted portion 122 of the slide 96' exposes the orifices 106, 106', thus causing the oil to be drained and the clack valve 88 to be opened as in FIGURE 5. It will be appreciated that the adjustment of the total length of the flexible link 112 (by means of the drum 116) makes it possible to vary the point in the stroke at which the orifices 106, 106' are exposed.

Figure 6:
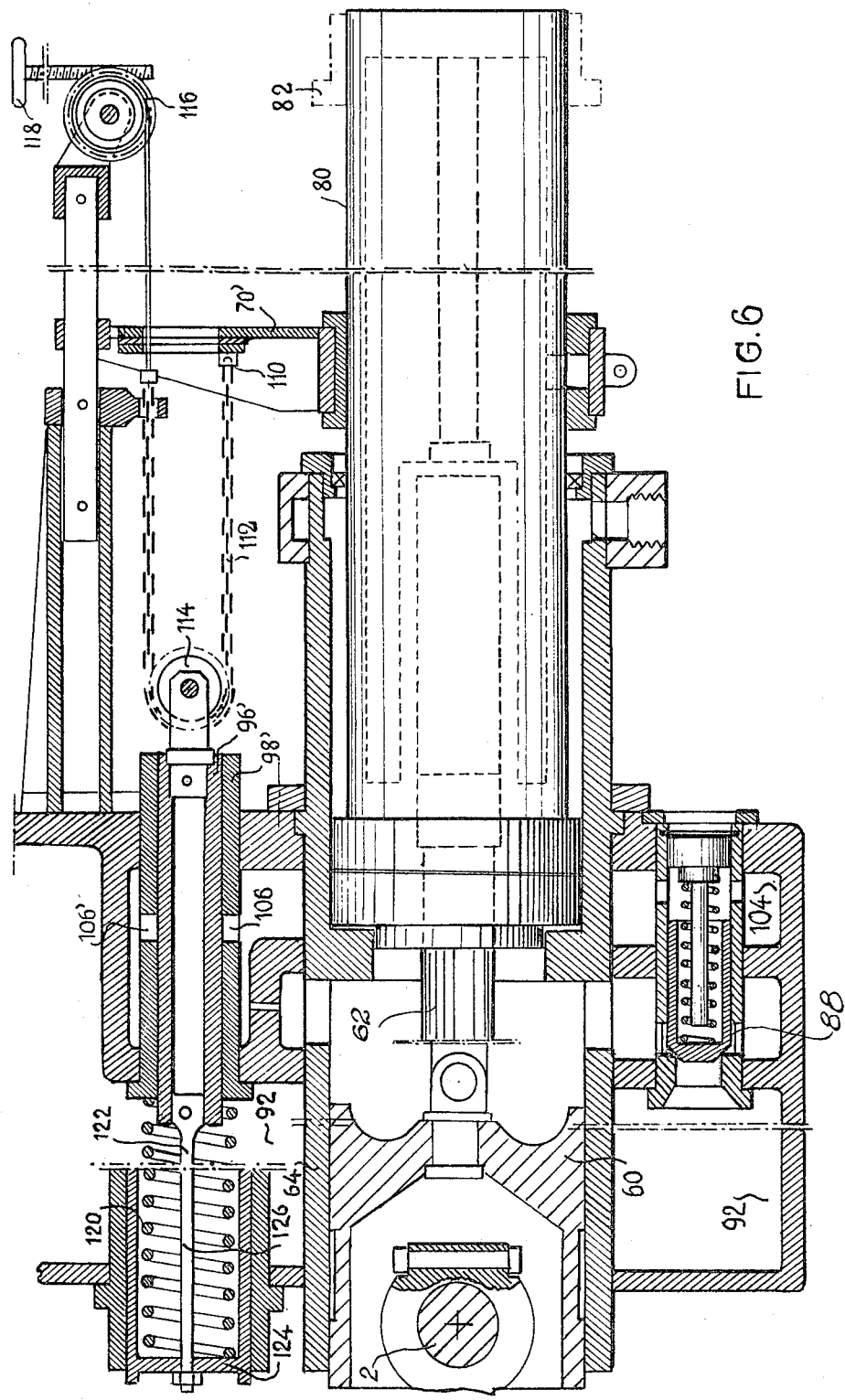
FIGURE 6 shows a modification of a stroke-regulating system mounted on a coupling identical with that shown in FIGURE 5.

In the embodiment shown in FIGURE 6, a balancing piston 124 is coupled to the slide 96' by a rod 126 so as to cooperate with the spring 120 in maintaining the slide 122 to counter-balance the pressure prevailing in the tank 92.

Any system for transmitting movement other than the cable and pulley system shown may also be used, provided that the slide has a permanently reciprocating movement of variable origin.

The invention is not of course restricted to the examples described and illustrated. Many variations thereof are available to the expert, according to the applications envisaged and without departing from the spirit of the invention.

That which is claimed is:

1. In a construction including a drive member having a drive shaft adapted to reciprocate in a pre-set pattern between first and second positions, and a driven member adapted to be moved by said drive member between first and second positions, the improvement comprising hydraulic coupling means adapted to regulate the extent of the movements imparted to said driven member, said coupling means including a first piston connected to said drive shaft, a cylinder for holding hydraulic fluid, a second piston connected to said driven member and means communicating said cylinder with said second piston whereby movement of said first piston can transmit corresponding movement to said second piston, first and second outlet lines associated with said cylinder, first and second valve means associated with the respective outlet lines, an hydraulic fluid reservoir in communication with said outlet lines, means for operating said first valve means at a time intermediate the completion of the stroke of said first piston as it moves from said first position to said second position to open communication between said cylinder and said first outlet line whereby said fluid can be passed from said cylinder through said first outlet line to said reservoir to relieve said pressure of said fluid on said second piston and to thereby effect stopping of said second piston before completion of said stroke, and means for operating said second valve means at a time intermediate the completion of the return stroke of said first piston to open communication between said reservoir and said cylinder through said second outlet line during said return stroke for returning said fluid to said cylinder.

2. A construction in accordance with claim 1 wherein a second cylinder is provided for said second piston and wherein said outlet means is defined by said first mentioned cylinder.

3. A construction in accordance with claim 1 wherein said first and second pistons are each mounted for movement in said cylinder and wherein said outlet means is defined in said cylinder at a point intermediate the positions of said first and second pistons.

4. A construction in accordance with claim 1 wherein said second piston is integrally formed as the end wall of said cylinder and wherein said outlet means is defined between said end wall and said first piston.

5. In a construction including a drive member having a drive shaft adapted to reciprocate in a pre-set pattern between first and second positions, and a driven member adapted to be moved by said drive member between first and second positions, the improvement comprising hydraulic coupling means adapted to regulate the extent of the movements imparted to said driven member, said coupling means including a first piston connected to said drive shaft, a cylinder for holding hydraulic fluid, a second piston connected to said driven member and means communicating said cylinder with said second piston whereby movement of said first piston can transmit corresponding movement to said second piston, outlet means associated with said cylinder, means for opening said outlet means during the stroke of said first piston as it moves from said first position to said second position whereby said fluid can be removed from said cylinder through said outlet means to relieve said pressure of said fluid on said second piston and to thereby effect stopping of said second piston before completion of said stroke, and means for returning said fluid to said cylinder and for returning said pistons to said first position, and wherein said cylinder comprises a fixed cylinder and wherein said first piston is mounted for movement in said fixed cylinder, a second cylinder slideably received within said fixed cylinder, said second piston being movable relative to said second cylinder and said driven member being connected to said second cylinder, said outlet means being located for communication with the space defined between said first piston and the adjacent face at one end of said second cylinder.

6. A construction in accordance with claim 5 wherein said first piston moves in a first chamber defined by the walls of said fixed cylinder, one face of said first piston, and said adjacent face of said second cylinder, a low pressure fluid reservoir, a second fluid chamber defined by the walls of said second cylinder, the opposite face at said end of said second cylinder and one face of said first piston, and automatic control means for selectively placing said fluid reservoir and said second chamber into communication with said first chamber.

7. A construction in accordance with claim 6 wherein said control means comprise a non-return valve permitting passage from said first chamber to said second chamber and a drainage valve permitting passage from said first chamber to said fluid reservoir, the opening of said drainage valve being controlled by the interaction of the operating member of said valve with an abutment when connected for movement with said driven member.

8. A construction in accordance with claim 6 wherein said control means comprise at least one non-return valve allowing oil to be sucked out of said fluid reservoir and toward said first chamber, a drainage valve, an abutment connected for movement with said driven member, and an adjustable abutment, engagement of said abutments providing for opening of said drainage valve whereby the position of said adjustable abutment determines the length of the stroke of said driven member.

9. A construction in accordance with claim 8 wherein said adjustable abutment is attached to a movable cylinder connected to hydraulic means for moving this cylinder and associated abutment means to different positions.

10. A construction in accordance with claim 7 wherein said control means comprise at least one non-return valve allowing oil to be sucked out of the fluid reservoir toward said first chamber, a drainage valve, a cable means attached at one end to said fixed abutment for movement with said driven member, said cable means being operatively connected to said drainage valve whereby movement of said driven member operates to open said drainage valve, and means for adjusting the length of said cable means.

References Cited by the Examiner
UNITED STATES PATENTS

| | | | |
|---|---|---|---|
| 662,515 | 11/1900 | Yale | 74—583 |
| 1,802,790 | 4/1931 | Squires | 60—54.5 X |
| 1,954,534 | 4/1934 | Norton | 60—54.5 X |
| 2,135,011 | 11/1938 | McGauchie | 60—54.5 |
| 2,602,434 | 7/1952 | Barnaby | 60—54.5 X |

MARTIN P. SCHWADRON, *Primary Examiner.*
ROBERT BUNEVICH, *Examiner.*